US012561283B2

(12) United States Patent
Eda et al.

(10) Patent No.: US 12,561,283 B2
(45) Date of Patent: Feb. 24, 2026

(54) ADDING AND/OR REMOVING NODES FROM CLUSTERED FILESYSTEMS

(71) Applicant: International Business Machines Corporation, Armonk, NY (US)

(72) Inventors: Sasikanth Eda, Vijayawada (IN); Kuei-Yu Wang-Knop, Poughkeepsie, NY (US); Felipe Knop, Poughkeepsie, NY (US); Frank Schmuck, Campbell, CA (US); Muthu Annamalai Muthiah, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/384,320

(22) Filed: Oct. 26, 2023

(65) Prior Publication Data

US 2025/0139056 A1 May 1, 2025

(51) Int. Cl.
*G06F 16/10* (2019.01)
*G06F 16/16* (2019.01)
*G06F 16/182* (2019.01)

(52) U.S. Cl.
CPC .......... *G06F 16/162* (2019.01); *G06F 16/182* (2019.01)

(58) Field of Classification Search
CPC .............................. G06F 16/162; G06F 16/182
USPC .................................. 707/827, 829, 822, 831
See application file for complete search history.

(56) References Cited

U.S. PATENT DOCUMENTS

| | | | | |
|---|---|---|---|---|
| 5,895,474 A | * | 4/1999 | Maarek ................... | G06F 16/34 |
| | | | | 715/260 |
| 7,213,010 B2 | * | 5/2007 | Estrada ................... | G06F 9/465 |
| | | | | 707/999.102 |
| 7,593,968 B2 | | 9/2009 | Beck | |
| 9,047,309 B1 | | 6/2015 | Pawar et al. | |
| 9,901,906 B2 | * | 2/2018 | Ohtake ................... | B01J 23/10 |
| 9,910,906 B2 | * | 3/2018 | Karve ................... | H04L 67/34 |
| 10,284,433 B2 | * | 5/2019 | Karve ................. | H04L 67/1095 |
| 11,321,194 B2 | * | 5/2022 | Puvvada ............... | G06F 16/166 |
| 2003/0088425 A1 | | 5/2003 | Lam et al. | |
| 2005/0289388 A1 | * | 12/2005 | Black-Ziegelbein ....................... | |
| | | | | H04L 41/0893 |
| | | | | 714/6.32 |
| 2009/0172674 A1 | * | 7/2009 | Bobak ................. | G06F 11/1482 |
| | | | | 718/101 |
| 2014/0280444 A1 | * | 9/2014 | Hildebrand .......... | G06F 3/0635 |
| | | | | 709/201 |

(Continued)

FOREIGN PATENT DOCUMENTS

| | | | |
|---|---|---|---|
| WO | WO 01/82678 A1 | * | 11/2001 |
| WO | WO 01/82678 A2 | * | 11/2001 |
| WO | 2020252088 A1 | | 12/2020 |

*Primary Examiner* — Daniel A Kuddus
(74) *Attorney, Agent, or Firm* — Zilka-Kotab, P.C.

(57) ABSTRACT

A computer-implemented method, according to one approach, includes: receiving a request to create a new node in a clustered filesystem. In response to receiving the request, a copy of details is retrieved, the copy of details being associated with an established singleton cluster pre-configured to access the clustered filesystem. The retrieved copy of details are further applied to a new node in the clustered filesystem. Moreover, data structures of the new node are modified according to the received request. Other systems, methods, and computer program products are described in additional approaches herein.

20 Claims, 6 Drawing Sheets

(56)              References Cited

U.S. PATENT DOCUMENTS

| 2016/0378844 | A1* | 12/2016 | Karve | G06F 16/178 |
| | | | | 707/620 |
| 2016/0380840 | A1* | 12/2016 | Karve | H04L 67/06 |
| | | | | 709/223 |
| 2017/0026378 | A1* | 1/2017 | Beck | H04L 63/101 |
| 2017/0054796 | A1* | 2/2017 | Eda | H04L 67/565 |
| 2017/0329552 | A1* | 11/2017 | Baldwin | G06F 3/0685 |
| 2019/0097900 | A1 | 3/2019 | Rodriguez et al. | |
| 2019/0114211 | A1* | 4/2019 | Reddipalli | G06F 16/254 |
| 2019/0334909 | A1 | 10/2019 | Schmitt et al. | |
| 2021/0357246 | A1* | 11/2021 | Kumar | G06F 3/067 |
| 2022/0100573 | A1 | 3/2022 | Allen | |
| 2022/0121502 | A1* | 4/2022 | Schmitt | G06F 9/4881 |
| 2023/0121460 | A1 | 4/2023 | Banerjee et al. | |

* cited by examiner

100

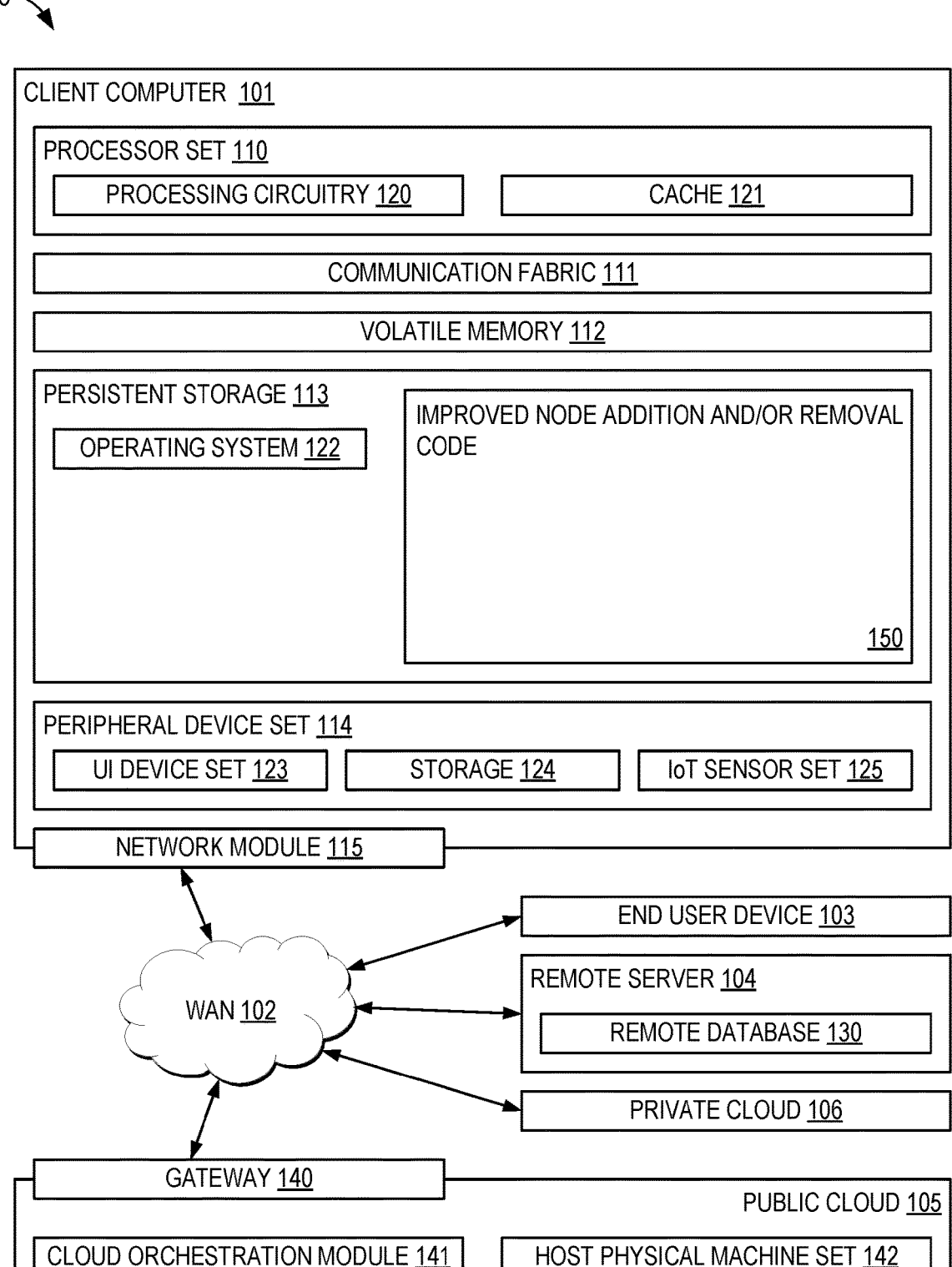

CLIENT COMPUTER 101

PROCESSOR SET 110

PROCESSING CIRCUITRY 120     CACHE 121

COMMUNICATION FABRIC 111

VOLATILE MEMORY 112

PERSISTENT STORAGE 113

OPERATING SYSTEM 122

IMPROVED NODE ADDITION AND/OR REMOVAL CODE

150

PERIPHERAL DEVICE SET 114

UI DEVICE SET 123     STORAGE 124     IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141     HOST PHYSICAL MACHINE SET 142

VIRTUAL MACHINE SET 143     CONTAINER SET 144

Create a clustered filesystem — 351

Establish authorization to access the clustered filesystem — 352

Collect configuration data associated with the authorization to access the clustered filesystem — 353

Store the collected configuration data in external storage — 354

ADDING AND/OR REMOVING NODES FROM CLUSTERED FILESYSTEMS

BACKGROUND

The present invention relates to clustered filesystems, and more specifically, this invention relates to efficiently adding and/or removing nodes from clustered filesystems.

As computing power continues to advance and the use of IoT devices becomes more prevalent, the amount of data produced continues to increase. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in conventional systems in an effort to improve the ability to process this increasing amount of data, the unprecedented scale and complexity at which data is being created has outpaced network and infrastructure capabilities. Sending all device-generated data to a centralized data center or to a cloud location has resulted in bandwidth and latency issues in conventional systems.

In an attempt to combat this reliance on a network to perform all processing at a central location, edge computing has been implemented to extend computing to the endpoints in a system. For instance, applications are moved to the edge locations where the data is generated. In response, conventional workload managers have been designed to improve on-premises investments, typically resorting to cloud bursting when dealing with a situation where additional capacity and/or specific resources are desired. During cloud bursting, the workload managers schedule the workload as soon as the compute resources on cloud become available to facilitate application scaling.

SUMMARY

A computer-implemented method, according to one approach, includes: receiving a request to create a new node in a clustered filesystem. In response to receiving the request, a copy of details is retrieved, the copy of details being associated with an established singleton cluster preconfigured to access the clustered filesystem. The retrieved copy of details are further applied to a new node in the clustered filesystem. Moreover, data structures of the new node are modified according to the received request.

A computer program product, according to another approach, includes a computer readable storage medium having program instructions embodied therewith. The program instructions are readable by a processor, executable by the processor, or readable and executable by the processor, to cause the processor to: perform the foregoing method.

A system, according to yet another approach, includes: a first edge node connected to a central data storage location. The system also includes a processor as well as logic that is integrated with the processor, executable by the processor, or integrated with and executable by the processor. Moreover, the logic is configured to: perform the foregoing method.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

DETAILED DESCRIPTION

Figure 2:
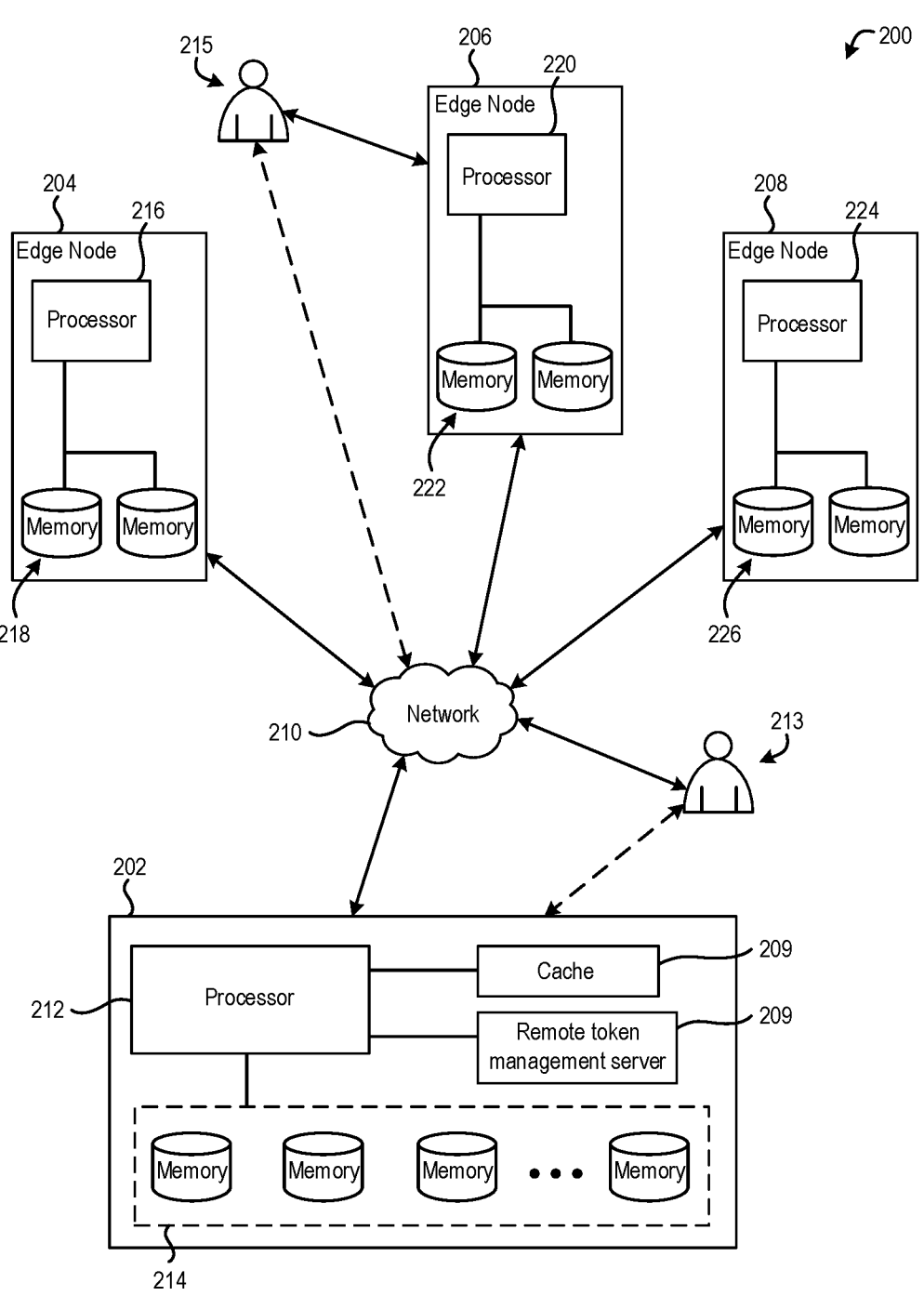
FIG. 2 is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for efficiently adding and removing nodes from a clustered filesystem by emulating preestablished singleton clusters as well as fencing off failed and/or lost nodes. As a result, implementations herein are desirably able to reduce the amount of time associated with adding and/or removing nodes from a clustered filesystem. For instance, by emulating a singleton cluster which is already authorized to mount the filesystem, implementations herein are desirably able to achieve improved filesystem performance by performing advanced cloning for each node added to the clustered filesystem. Moreover, by fencing off failed and/or lost nodes, implementations herein are able to significantly improve the efficiency by which failed nodes are removed from the clustered filesystem, e.g., as will be described in further detail below.

In one general approach, a computer-implemented method includes: receiving a request to create a new node in a clustered filesystem. In response to receiving the request, a copy of details is retrieved, the copy of details being associated with an established singleton cluster preconfigured to access the clustered filesystem. The retrieved copy of details are further applied to a new node in the clustered filesystem. Moreover, data structures of the new node are modified according to the received request.

It follows that implementations herein are desirably able to reduce the amount of time associated with adding and/or removing a node from a clustered filesystem. For instance, by emulating a singleton cluster which is already authorized to mount the filesystem, implementations herein are desirably able to achieve improved filesystem performance by performing advanced cloning for each node added to the clustered filesystem. This further improves the membership workflow to achieve efficient addition and removal of compute resources (e.g., such as nodes, instances, etc.) from a clustered filesystem, thereby avoiding idle time for the allocated resources. This significantly improves the performance of the system as a whole.

In some implementations, applying the retrieved copy of details to the new node in the clustered filesystem includes: customizing information corresponding to the new node, where the information may include a host name, an Internet protocol address, a node name, etc. Moreover, in some implementations, the retrieved copy of details includes a template image. In such implementations, the process of retrieving a copy of the details associated with the established singleton cluster includes: sending a request to external storage, and receiving a copy of the template image.

As noted above, by establishing singleton clusters that are preauthorized to mount the filesystem, implementations herein are desirably able to achieve improved filesystem performance by performing advanced cloning for each node added to the clustered filesystem. Moreover, using template images further reduces the amount of time and compute resources associated with emulating an established singleton cluster, thereby further improving performance.

In some implementations, the clustered filesystem includes existing nodes, and the request to create the new node is received from one or more of the existing nodes in the clustered filesystem. Moreover, the process of causing the data structures to be modified may include causing central configuration repository data and/or cached states to be modified. It follows that implementations herein extend clustered filesystems over distributed systems (e.g., networks), thereby expanding the improvements to operating efficiency achieved herein across multiple remote sub-systems. As a result, the amount of time associated with adding and/or removing a node from a clustered filesystem is reduced.

In some implementations, node failures are experienced. In response to detecting a node failure in the clustered filesystem, the failed node is fenced off. The failed node is also instructed to relinquish a corresponding token back to a token manager. In some instances, the token manager is a remote token management server.

By fencing off failed and/or lost nodes, implementations herein are able to significantly improve the efficiency by which failed nodes are removed from the clustered filesystem. Additionally, efficient token management and cluster management allows for data consistency during the process of removing a node. Preferred approaches implement voluntary token relinquishing such that node failure recovery introduces less latency than in conventional products, at least in part as a result of eliminating any wait for safe recovery.

In another general approach, a computer program product includes a computer readable storage medium having program instructions embodied therewith. The program instructions are readable by a processor, executable by the processor, or readable and executable by the processor, to cause the processor to: perform the foregoing method.

In yet another general approach, a system includes: a first edge node connected to a central data storage location. The system also includes a processor as well as logic that is integrated with the processor, executable by the processor, or integrated with and executable by the processor. Moreover, the logic is configured to: perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product implementation ("CPP implementation" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved node addition and/or removal code at block 150 for efficiently adding and removing nodes from a clustered filesystem by emulating preestablished singleton clusters as well as fencing off failed and/or lost nodes. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like.

Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, data production has continued to increase as computing power and the use of IoT devices advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in conventional systems in an effort to improve the ability to process this increasing amount of data, the unprecedented scale and complexity at which data is being created has outpaced network and infrastructure capabilities. Sending all device-generated data to a centralized data center or to a cloud location has resulted in bandwidth and latency issues in conventional systems.

In an attempt to combat this reliance on a network to perform all processing at a central location, edge computing has been implemented to extend computing to the endpoints in a system. For instance, applications are moved to the edge locations where the data is generated. In response, conventional workload managers have been designed to optimize on-premises investments, typically resorting to cloud bursting when dealing with a situation where additional capacity and/or specific resources are desired. During cloud bursting, the workload managers schedule the workload as soon as the compute resources on cloud become available to facilitate application scaling.

However, there are limited conventional options when attempting to provide shared storage to these compute resources. Accordingly, these conventional products often result in inadequate performance. Even attempts to apply conventional cloud hosted clustered filesystem have suffered from poor performance. For example, the rapid deployment (e.g., expansion and contraction) experienced by workload managers poses challenges to a cloud hosted clustered filesystem. The process of adding and/or removing nodes (e.g., compute resources) from the clustered filesystem is a time laborious process which involves membership state checks and calculations, consensus protocol participation, state synchronization, security checks, cluster configuration management, propagation, etc., and other steps. Conventionally, nodes have thereby been statically formed to access the clustered file system, leading to compute resources being idle when not in use, thereby wasting resources.

Accordingly, a need exists for an improved process of adding and removing nodes from a clustered filesystem. In sharp contrast to these conventional shortcomings, implementations herein have desirably been able to improve the membership workflow to facilitate efficient addition and removal of compute resources (e.g., such as nodes, instances, etc.) from a clustered filesystem, thereby avoiding idle time for the allocated resources. This significantly improves the performance of the system as a whole, e.g., as will be described in further detail below.

Looking now to FIG. 2, a system 200 having a distributed architecture is illustrated in accordance with one approach. For instance, the system 200 may include a clustered filesystem implemented therein. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2 (and the other FIGS.) may be deemed to include any possible permutation.

As shown, the system 200 includes a central data storage location 202 that is connected to a first edge node 204, a second edge node 206, and a third edge node 208. Specifically, the central data storage location 202 and edge nodes 204, 206, 208 are connected to a network 210, and may thereby be positioned in different geographical locations. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between the edge nodes 204, 206, 208 and/or central data storage location 202, regardless of the amount of separation which exists therebetween, e.g., despite being positioned at different geographical locations.

However, it should also be noted that two or more of the edge nodes 204, 206, 208 and/or central data storage location 202 may be connected differently depending on the approach. According to an example, two edge compute nodes may be located relatively close to each other and connected by a wired connection, e.g., a cable, a fiber-optic link, a wire, etc.; etc., or any other type of connection which would be apparent to one skilled in the art after reading the present description.

With continued reference to FIG. 2, the edge nodes 204, 206, 208 may have a different configuration than the central data storage location 202. For example, in some implementations the central data storage location 202 includes a large (e.g., robust) processor 212 coupled to a cache 209 and a data storage array 214 having a relatively high storage capacity. The central data storage location 202 is thereby able to process and store a relatively large amount of data, allowing it to be connected to, and manage, multiple different remote edge nodes (also referred to herein as "nodes"). As noted above, the central data storage location 202 may receive data, commands, etc. from any number of locations. The components included in the central data storage location 202 thereby preferably have a higher storage capacity and throughput than components included in each of the edge nodes 204, 206, 208 to accommodate the higher flow of data experienced at the central data storage location 202.

Figure 3A:
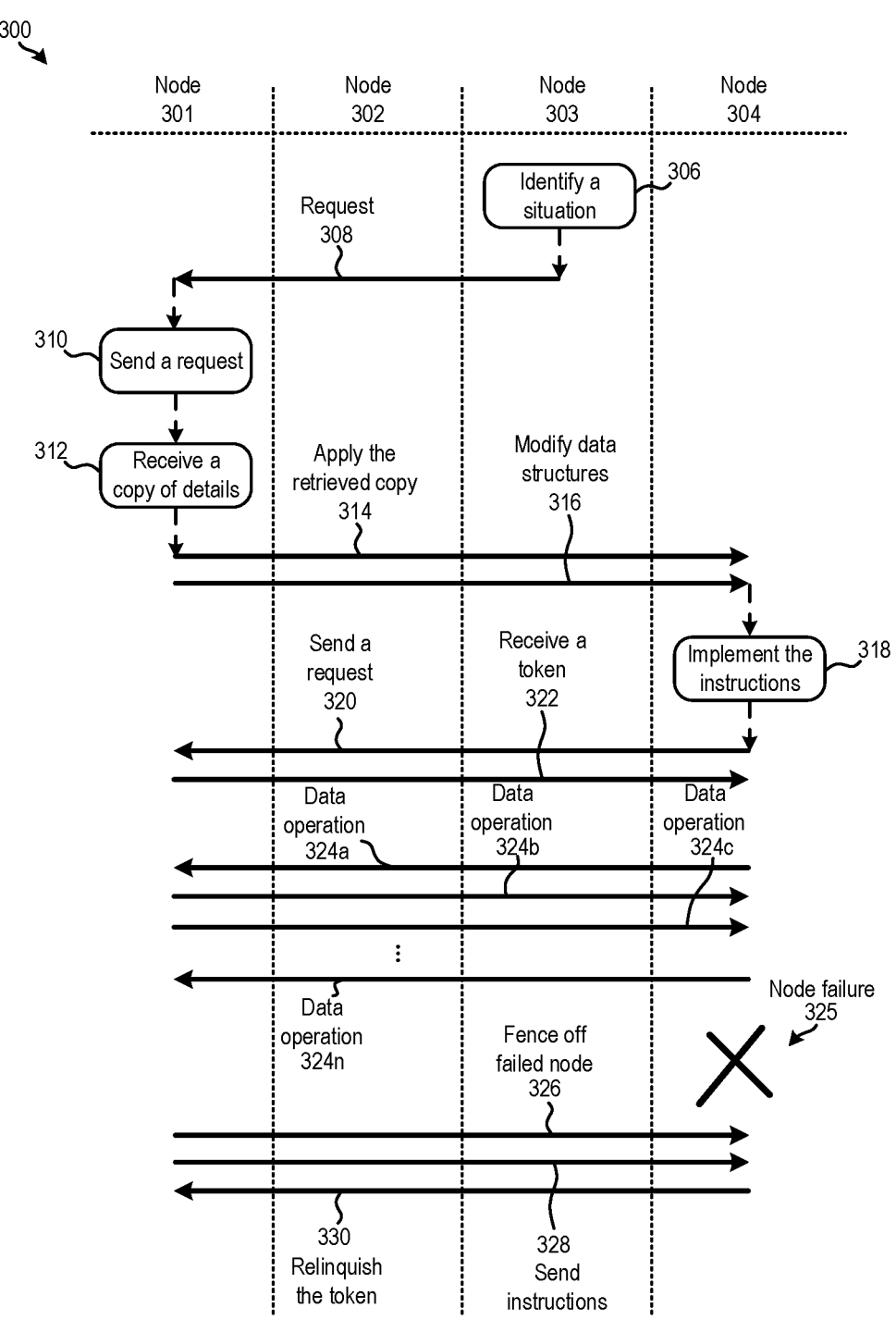
FIG. 3A is a flowchart of a method, in accordance with one approach.

It should be noted that with respect to the present description, "data" may include any desired type of information. For instance, in different implementations data can include raw sensor data, metadata, program commands, instructions, etc. Moreover, while implementations herein are described in the context of unstructured data, this is in no way intended to be limiting. Any desired type of data may be applied to the approaches herein. It follows that the processor 212 may use the cache 209 and/or storage array 214 to actually cause one or more data operations to be performed. According to an example, the processor 212 at the central data storage location 202 may be used to perform one or more operations of method 300 of FIG. 3A.

An administrator 213 of the central data storage location 202 and/or processor 212 itself is shown as being connected to network 210 in FIG. 2. In some implementations, the administrator 213 may be directly connected to the central data storage location 202 as represented by the dashed arrowed line. It follows that the administrator 213 may be able to control at least a portion of the central data storage location 202. In some approaches, the administrator 213 may be able to control a clustered filesystem that is accessible from the central data storage location 202 and distributed across edge nodes 204, 206, 208, e.g., as would be appreciated by one skilled in the art after reading the present description.

The system 200 also preferably includes a remote token management server 211 (but may include more than one token management servers) that is configured to issue tokens to nodes of the system 200 such that they may access the clustered filesystem. In other words, the remote token management server 211 manages (e.g., determines) whether each node is permitted to read and/or write files in the clustered file system. This may be determined based on whether the node is active (e.g., operational), verified, etc. As shown, the remote token management server 211 is implemented at the central data storage location 202 according to one approach. However, this is in no way intended to be limiting. In other approaches, a remote token management server may be implemented at a remote location that is connected to (e.g., in communication with) the central data storage location 202 over network 210.

A user 215 is illustrated as being connected to one of the edge nodes 206. In some approaches, the user 215 connects to the edge node 206 through a compute device (e.g., such as the user's personal computer, mobile phone, etc.) such that information can be exchanged therebetween. However, in other approaches the user 215 may be able to access the edge node 206 using one or more terminals having a user interface. The user 215 may also be connected to the network 210 in some implementations. Accordingly, the user 215 may access edge node 206 and/or other locations in system 200 through the network 210 in such implementations. In still other implementations, the user may be able to access network 210 through a direct connection to the edge node 206.

The first edge node 204 includes a processor 216 coupled to memory 218. Similarly, edge node 206 includes a processor 220 coupled to memory 222, and edge node 208 includes a processor 224 coupled to memory 226. The memory implemented at each of the edge nodes 204, 206, 208 may be used to store data received from one or more sensors (not shown) in communication with the respective edge nodes, a user 215 in communication with one or more of the edge nodes, other ones of the edge nodes, different systems also connected to network 210, etc.

As alluded to above, the memory 218, 222, 226 at each of the respective edge nodes 204, 206, 208 may implement a respective portion of a clustered filesystem. For example, each memory 218, 222, 226 may effectively serve as a node of the clustered filesystem. Each of these nodes may store different portions of data such that the clustered filesystem is distributed across the system 200, thereby improving data retention.

It should also be noted that while the edge nodes 204, 206, 208 are depicted as including similar components and/or design, each of the edge nodes 204, 206, 208 may include any desired components which may be implemented in any desired configuration. In some instances, each edge node in a system may be configured differently to provide each location with a different functionality. According to an example, which is in no way intended to limit the invention, edge node 204 may include a cryptographic module (not shown) that allows the edge node 204 to produce encrypted data, while edge node 206 includes a data compression module (not shown) that allows the edge node 206 to produce compressed data.

It follows that the different edge nodes (e.g., servers) in system 200 may have different performance capabilities. As noted above, the central data storage location 202 may have a higher storage capacity compared to the edge nodes 204, 206. While this may allow the central data storage location 202 the ability to store more data than the edge nodes 204, 206, 208, other factors impact performance. For example, traffic over network 210 may limit the amount of data that may be sent from the edge nodes 204, 206, 208 to the central data storage location 202. The workload experienced at a given time also impacts latency and limits the achievable performance of the system 200.

As noted above, while FIG. 2 includes three different edge nodes 204, 206, 208, components in the system 200 may change over time. Additional edge nodes may be added to the system 200 and/or edge nodes may be removed from the system 200 depending on the situation. For example, the amount of data processed by a clustered filesystem may increase significantly over time. Accordingly, it may be desirable to increase the number of edges nodes that are used to process that increased amount of data. In another example, an edge node may become inactive over time in response to receiving less data to process, another customer is offering a higher payment for the compute capabilities than a current user, etc. Rather than unnecessarily consuming system resources, an inactive edge node may be removed from a clustered filesystem.

While conventional products have suffered significant inefficiencies while adding nodes to, and removing nodes from, a clustered filesystem, implementations herein have been able to successfully reverse these conventional shortcomings. For instance, FIG. 3A includes a flowchart of a computer-implemented method 300 for efficiently adding and removing nodes from a clustered filesystem by emulating preestablished singleton clusters (also referred to herein as a "template node"), e.g., as will be described in further detail below. The method 300 may be performed in accordance with the present invention in any of the environments depicted in FIGS. 1-2, among others, in various approaches. Of course, more or fewer operations than those specifically described in FIG. 3A may be included in method 300, as would be understood by one of skill in the art upon reading the present descriptions.

Each of the steps of the method 300 may be performed by any suitable component of the operating environment. For example, each of the nodes 301, 302, 303, 304 shown in the flowchart of method 300 may correspond to one or more processors positioned at a different node of a clustered filesystem. Moreover, each of the one or more processors are preferably configured to communicate with each other.

In various implementations, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 3A includes different nodes 301, 302, 303, 304, each of which represent one or more processors, controllers, computer, etc., at a different location in a clustered filesystem. For instance, node 304 may include one or more processors which are included at a first edge node of a clustered filesystem (e.g., see edge node 204 of FIG. 2 above). Similarly, nodes 302 and 303 may each include one or more processors at second and third edge nodes of a clustered filesystem (e.g., see edge nodes 206, 208 of FIG. 2 above). Furthermore, node 301 may include one or more processors which are located at a central server configured to manage a clustered filesystem (e.g., see central data storage location 202 of FIG. 2 above). It follows that commands, data, requests, etc. may be sent between each of the nodes 301, 302, 303, 304 depending on the approach. Moreover, it should be noted that the various processes included in method 300 are in no way intended to be limiting, e.g., as would be appreciated by one skilled in the art after reading the present description. For instance, data sent from node 302 to node 303 may be prefaced by a request sent from node 303 to node 302 in some approaches.

As shown, operation 306 of method 300 is performed at node 303. There, operation 306 includes identifying a situation that calls for another node to be added to the clustered filesystem. In other words, operation 306 includes identifying a predicted influx of data, initiating a compute intensive operation, receiving a request from a user (e.g., node administrator), etc. In response to identifying that an additional node is desired in the clustered filesystem, node 303 generates a request for a new node.

Looking to operation 308, a request to create a new node in a preexisting clustered filesystem is sent from node 303 to node 301. It follows that a clustered filesystem having existing nodes formed using cloud and/or on-premises resources may identify situations where a size of the clustered filesystem should be increased and take appropriate action. For example, one or more existing nodes may request that one or more new nodes are created in the clustered filesystem. Nodes are also preferably able to identify situations where the size of the clustered filesystem should be decreased, e.g., as will be described in further detail below.

In response to receiving the request at node 301, method 300 advances from operation 308 to operation 310. There, operation 310 includes sending a request for a copy of details associated with an established singleton cluster. In other words, operation 310 includes requesting configuration data that is associated with a singleton cluster. As noted above, method 300 is able to efficiently add and remove nodes from a clustered filesystem by emulating preestablished singleton clusters. With respect to the present description, a "singleton cluster" is intended to refer to a template node that has been preconfigured to access the clustered filesystem. In other words, the singleton cluster may be formed and tailored to mount the clustered filesystem. A singleton cluster may also be created using a single node. Thus, by emulating a singleton cluster that has been preconfigured (e.g., preauthorized) to access a clustered filesystem, a new node is able to access the filesystem much more quickly and as a result of consuming significantly fewer resources than has conventionally been achievable.

Figure 3B:
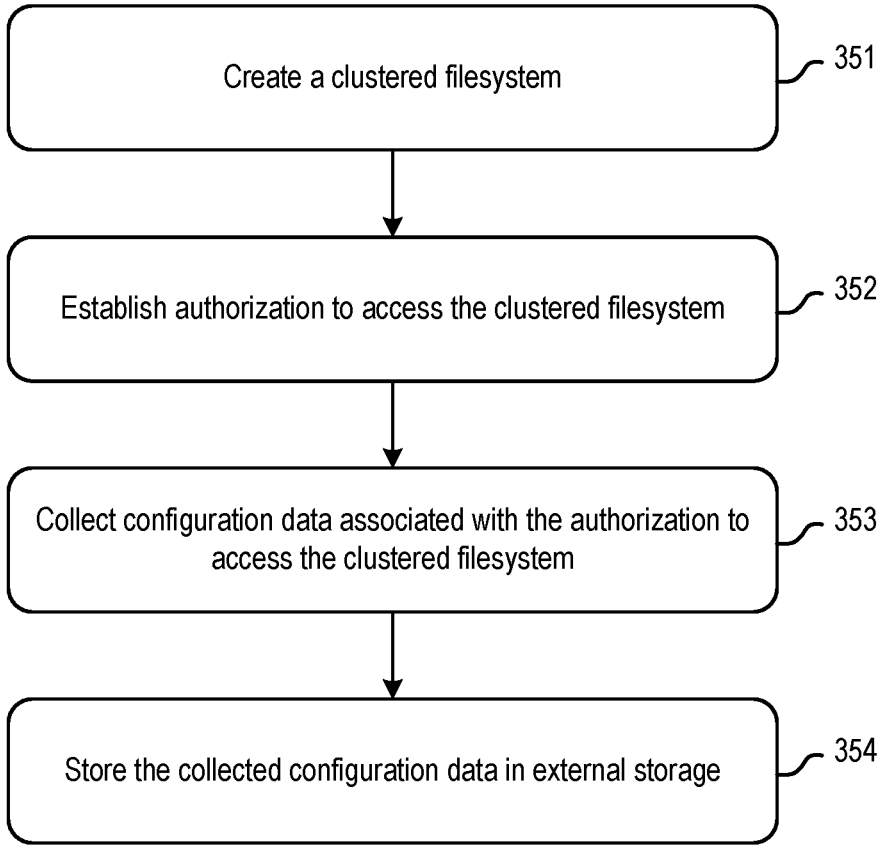
FIG. 3B is a flowchart of sub-operations that may be performed in association with one of the operations in the method of FIG. 3A, in accordance with one approach.

Referring momentarily to FIG. 3B, exemplary sub-operations of a process 350 for forming a singleton cluster and storing corresponding details for seamlessly adding new nodes to the clustered filesystem are shown in accordance with one approach. It follows that one or more of these sub-operations may be used to form the singleton cluster requested in operation 310 of FIG. 3A. However, it should be noted that the sub-operations of FIG. 3B are illustrated in accordance with one approach which is in no way intended to limit the invention.

As shown, sub-operation 351 includes creating a clustered filesystem. In some approaches, a clustered filesystem may be formed by combining multiple nodes to communication with each other. For example, a central location may be identified as managing the filesystem and/or the multiple nodes therein. The clustered filesystem may have different features and/or details depending on the given approach.

Sub-operation 352 further includes establishing authorization to access the clustered filesystem. In other words, sub-operation 352 includes creating a singleton cluster that has been preauthorized to access data in a clustered filesystem using a single node. Authorization may be established by verifying authenticity of an initial request to communicate with a clustered filesystem itself. In other approaches, the singleton cluster may receive authorization as a result of receiving confirmation from a verifying source. For example, an administrator in charge of managing the clustered filesystem may verify authenticity of a singleton cluster before it is given access to the filesystem. It follows that the singleton cluster may be formed during the process of creating the clustered filesystem in some approaches.

In response to the singleton cluster being created, the flowchart proceeds to sub-operation 353. There, sub-operation 353 includes collecting configuration data (e.g., files) associated with the singleton cluster accessing the clustered filesystem. In some approaches, the configuration data includes keys used to verify the identity of the singleton cluster. In some approaches, the configuration data may be collected directly from the singleton cluster itself and/or a lookup table associated with the singleton cluster. Moreover, this collected configuration data is preferably stored in memory such that it remains accessible. Accordingly, sub-operation 354 includes storing the collected configuration data in external storage.

Returning now to FIG. 3A, it follows that the request for details associated with an established singleton cluster sent in operation 310 may be sent to external storage. Again, information (e.g., configuration data) associated with a singleton cluster may be stored at a predetermined location in memory. Accordingly, the configuration data is easily accessible, further improving the efficiency by which a new node may be added to a clustered filesystem.

From operation 310, method 300 proceeds to operation 312. There, operation 312 includes retrieving a copy of details associated with the established singleton cluster. In other words, operation 312 includes actually receiving the configuration data that was requested in operation 310. It follows that in some approaches, the configuration data may be received from external storage.

Operation 314 further includes applying the retrieved copy of details to a new node in the clustered filesystem. Accordingly, operation 314 shows the configuration data being sent from node 301 to newly formed node 304. In some approaches, operation 314 includes customizing information corresponding to the new node. In other words, operation 314 may include customizing a host name, an Internet protocol (IP) address, a node name, etc. of the new node. This effectively transforms the copy of the established singleton cluster into a unique new node that is independently accessible in the clustered filesystem, e.g., as would be appreciated by one skilled in the art after reading the present description.

It follows that in some approaches, operation 314 may also include forming a new node for the clustered filesystem at node 304. For example, operation 314 may include allocating memory space for the new node, sending one or more commands and/or requests to a processor at node 304, updating a central representation of the clustered filesystem to indicate the new node, etc.

In some implementations, the retrieved copy of details includes a template image that may be used to form the new node. In other words, the configuration data associated with the established singleton cluster may be received in the form of a template image that serves as a template for the new node. According to an example, which is in no way intended to be limiting, a template image can be created using a template node or a node with clustered filesystem access software installed. In such approaches, a copy of the template image that is received may serve as a launch image for forming the new node. Moreover, the copy of the template image may be received from object storage where the template image may be stored. For example, a central management location (e.g., server) may be used to manage the object storage and transmit copies thereof to newly formed nodes.

Once the new node has been customized to emulate the singleton cluster, it may be configured to access data in the clustered filesystem. However, further customizations are preferably made to the node to further improve performance. For instance, operation 316 of FIG. 3A further includes causing data structures of the new node to be modified according to the received request. With respect to the present description, a "data structure" of the new node can be modified by adjusting central configuration repository data, cached status information of the existing nodes and/or clustered filesystem (e.g., "statuses"), etc.

Accordingly, operation 316 includes sending one or more instructions to node 304 which result in the new node being customized to meet any performance characteristics that may have been specified (e.g., requested) along with the request received at operation 308. Operation 318 further includes actually implementing (e.g., satisfying) the one or more instructions received from node 301 to modify a data structure of the new node, e.g., as would be appreciated by one skilled in the art after reading the present description.

Proceeding to operation 320, there the new node at node 304 sends a request for permission to access and modify data in the clustered filesystem. According to some approaches, permission is granted to nodes of a clustered filesystem using tokens. The request may thereby be sent to node 301 and directed to a token manager (e.g., see remote token management server 211 of FIG. 2) therein that is configured to issue and manage access tokens for a clustered filesystem. These tokens may be issued by the token manager to nodes that prove eligibility (e.g., by satisfying a secure verification). For instance, the tokens may grant access to files and/or directories or at least portions of files and/or directories. Thus, although not explicitly shown in FIG. 3A, the process of requesting permission to data in the clustered filesystem may involve satisfying one or more security based sub-operations that determine whether a token should be issued to the requesting node.

In some approaches, this procedure of issuing tokens aims to imitate the communication happening in single context of the Cluster Configuration Instance (CCI) of the cluster. For instance, as each new node joins the cluster to mount the filesystem, the cluster manager at central node 301 will construct a new address for the node consisting of a unique (in the clustered filesystem) node id, and a single remote cluster index. This helps the token manager allow access to the same file from multiple nodes without using designated meta nodes because they look like they belong to the same remote cluster when viewed in the context of the home cluster CCI. New nodes may thereby be able to communicate directly within the context of the home cluster CCI even though each new node may think it is the only member of the cluster in some approaches.

Operation 322 further includes receiving a token granting node 304 access to data in the clustered filesystem. Node 304 is thereby able to read data from, write data to, modify data in, etc. the clustered filesystem. Accordingly, operations 324a, 324b, 324c, . . . , 324n may be performed by (e.g., initiated by) one or more processors at node 304. It should be noted that while not explicitly shown in FIG. 3A, any of nodes 302, 303, 304, or any other node that has been granted access to the clustered file system may perform data read operations, data write operations, data modify operations, etc., as desired.

However, tokens are preferably revoked from nodes in certain situations. For instance, a node failure 325 preferably results in the failed node having its respective token revoked. Accordingly, method 300 proceeds to operation 326 in response to detecting that node 304 has failed. There, operation 326 includes fencing off failed node 304. In other words, operation 326 includes preventing the failed node 304 from accessing and/or modifying data in the clustered filesystem, e.g., at least until the failure has been resolved. This desirably avoids data corruption resulting from data operations inadvertently issued by a failed or failing node. According to an example, the token previously issued to node 304 (e.g., see operation 322 above) may be flagged as being no longer accepted. Thus, the data requests may be denied by the fencing mechanism, as the node that issued the request should be nonoperational. In other approaches, the data requests (e.g., read requests, write requests, modify requests, etc.) that are received from failed node 304 using the flagged token may be denied or stored in a log for later reference.

Moreover, operation 328 includes sending one or more instructions to failed node 304, the one or more instructions causing failed node 304 to relinquish the flagged (e.g., respective) token back to the token manager (e.g., remote token management server). In other words, the one or more instructions that are sent result in the tokens being forcibly removed from the failed node 304 by the token manager. Accordingly, operation 330 further includes relinquishing the token back to a token manager at node 301. However, in other approaches a token manager at node 301 may unilaterally revoke the previously issued token, e.g., by issuing one or more instructions.

It should be noted that with respect to the present description, a "node failure" may include any type of situation where the node is no longer available to perform requests. In some approaches, the failure may result from the node becoming inaccessible, e.g., because of an error or failure. For example, physical components in the node may fail and/or be deactivated in certain situations. In some approaches, this may occur as a result of a customer offering a higher payment for the compute capabilities than a current user. In other approaches, a node failure may simply result from inactivity (e.g., a lack of use) such that the node silently disappears from the clustered filesystem after a predetermined amount of time has passed and the node becomes available/useable again.

It follows that the operations of method 300 are desirably able to reduce the amount of time associated with adding and/or removing a node from a clustered filesystem. For instance, by emulating a singleton cluster which is already authorized to mount the filesystem, implementations herein are desirably able to achieve improved filesystem performance by performing advanced cloning for each node added to the clustered filesystem. Moreover, by fencing off failed and/or lost nodes, implementations herein are able to significantly improve the efficiency by which failed nodes are removed from the clustered filesystem.

Additionally, efficient token management and cluster management allows for data consistency during the process of removing a node. As noted above, preferred approaches implement processes that cause token relinquishing to occur, such that node failure recovery introduces less latency than in conventional products, at least in part as a result of eliminating any wait for safe recovery.

Approaches herein are thereby able to capture the state of an existing singleton cluster that has already been authorized to access the filesystem, and modify the data structures thereof such that the cloned nodes created using this process can readily join (e.g., access) the clustered filesystem much more efficiently than the laborious node joining process implemented in conventional products. Moreover, fencing lost nodes efficiently speeds up the node failure recovery process by avoiding the wait time associated with performing "safe recovery" as seen in conventional products when a failure occurs. This conventional safe recovery involves replaying a recovery log and using it to restore the file system to a consistent state, which is a time-consuming and resource intensive progress. Once again, it follows that implementations herein are able to significantly improve the efficiency by which nodes may be added to and/or removed from a clustered filesystem.

Figure 4:
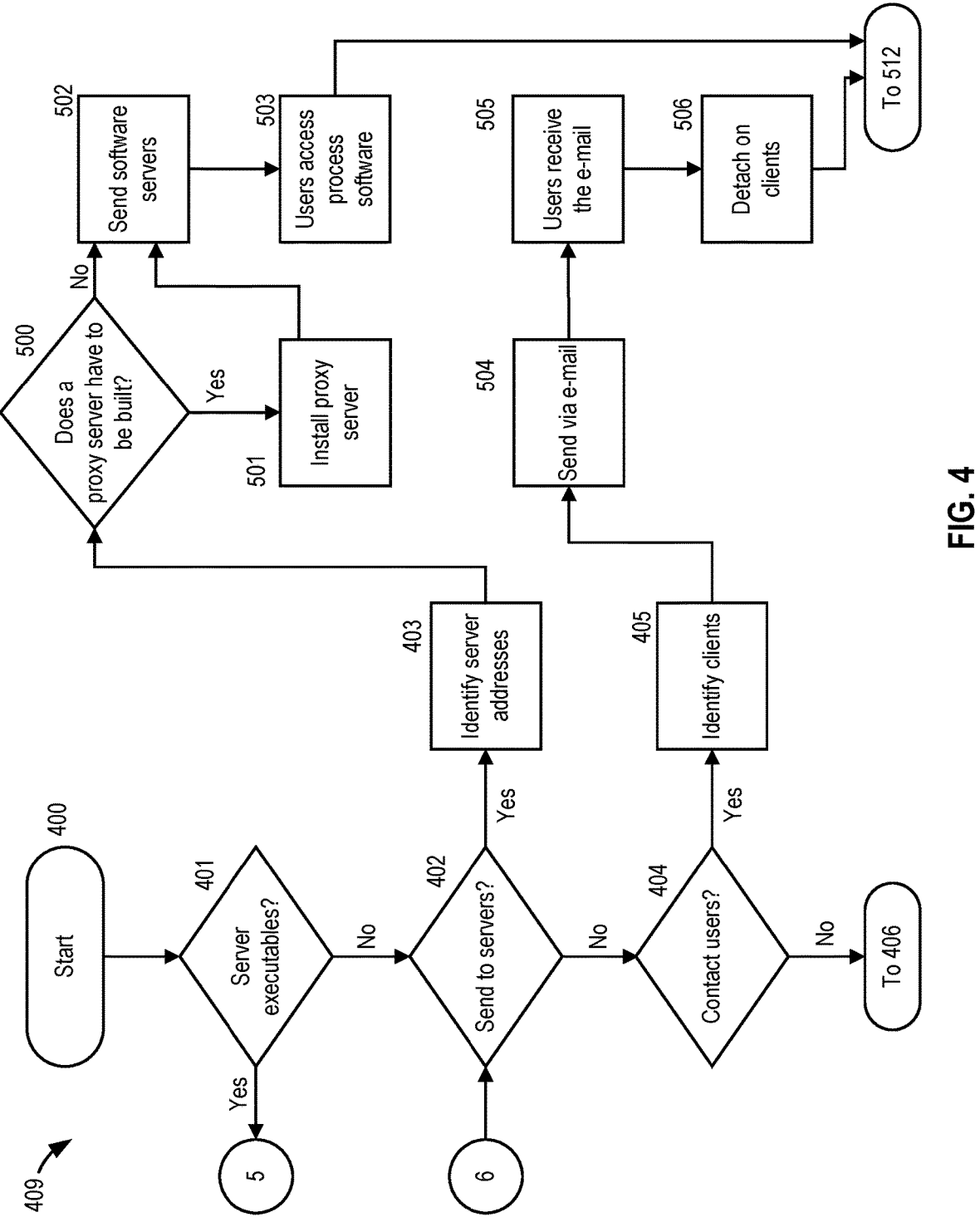
FIG. 4 is a flowchart of a method, in accordance with one approach.
Figure 4:
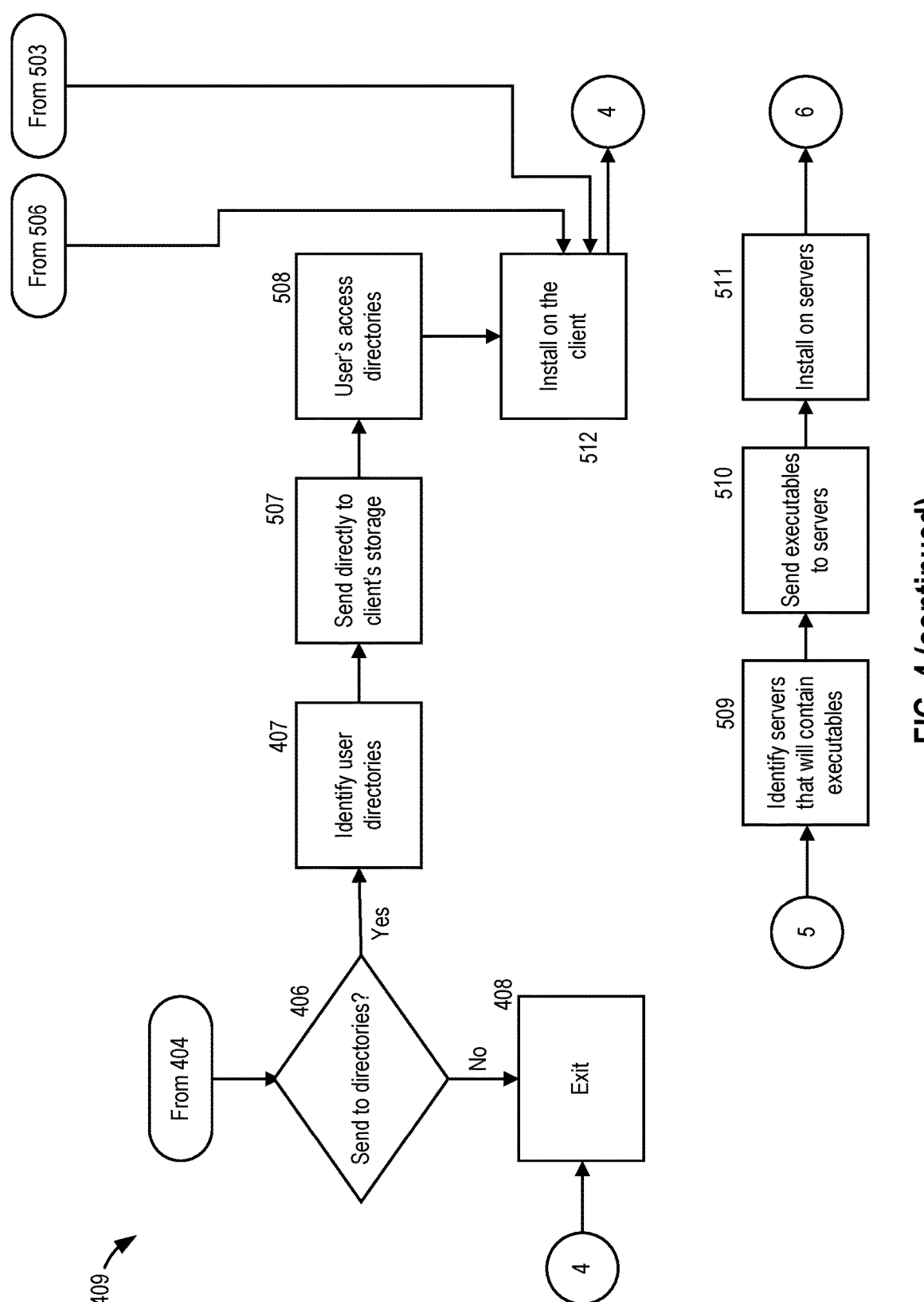

Now referring to FIG. 4, a flowchart of a method 409 is shown according to one approach. The method 409 may be performed in accordance with the present invention in any of the environments depicted in FIGS. 1-3B, among others, in various approaches. Of course, more or fewer operations than those specifically described in FIG. 4 may be included in method 409, as would be understood by one of skill in the art upon reading the present descriptions.

Each of the steps of the method 409 may be performed by any suitable component of the operating environment. For example, in various approaches, the method 409 may be partially or entirely performed by a processing circuit, e.g., such as an IaC access manager, or some other device having one or more processors therein. The processor, e.g., processing circuit(s), chip(s), and/or module(s) implemented in hardware and/or software, and preferably having at least one hardware component, may be utilized in any device to perform one or more steps of the method 409. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software associated with efficiently adding and removing nodes from a clustered filesystem by emulating preestablished singleton clusters as well as fencing off failed and/or lost nodes, may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

With continued reference to method 409, step 400 begins the deployment of the process software. An initial step is to determine if there are any programs that will reside on a server or servers when the process software is executed (401). If this is the case, then the servers that will contain the executables are identified (509). The process software for the server or servers is transferred directly to the servers' storage via FTP or some other protocol or by copying through the use of a shared file system (510). The process software is then installed on the servers (511).

Next, a determination is made on whether the process software is to be deployed by having users access the process software on a server or servers (402). If the users are to access the process software on servers, then the server addresses that will store the process software are identified (403).

A determination is made if a proxy server is to be built (500) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (501). The process software is sent to the (one or more) servers either via a protocol such as FTP, or it is copied directly from the source files to the server files via file sharing (502). Another approach involves sending a transaction to the (one or more) servers that contained the process software, and have the server process the transaction and then receive and copy the process software to the server's file system. Once the process software is stored at the servers, the users, via their client computers, then access the process software on the servers and copy to their client computers file systems (503). Another approach is to have the servers automatically copy the process software to each client and then run the installation program for the process software at each client computer. The user executes the program that installs the process software on the client computer (512) and then exits the process (408).

In step 404 a determination is made whether the process software is to be deployed by sending the process software to users via e-mail. The set of users where the process software will be deployed are identified together with the addresses of the user client computers (405). The process software is sent via e-mail (504) to each of the users' client computers. The users then receive the e-mail (505) and then detach the process software from the e-mail to a directory on their client computers (506). The user executes the program that installs the process software on the client computer (512) and then exits the process (408).

Lastly, a determination is made on whether the process software will be sent directly to user directories on their client computers (406). If so, the user directories are identified (407). The process software is transferred directly to the user's client computer directory (507). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (508). The user executes the program that installs the process software on the client computer (512) and then exits the process (408).

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method comprising:
receiving a request to create a new node in a clustered filesystem;
retrieving a copy of details associated with an established singleton cluster preconfigured to access the clustered filesystem, wherein the retrieved copy of details includes a template image;
using the template image to form a new node for the clustered filesystem by:
allocating memory space for the new node, and
updating a central repository of the clustered filesystem indicating the new node has been formed,
applying the retrieved copy of details to the new node in the clustered filesystem;
causing data structures of the new node to be modified according to the received request; and
in response to detecting the new node has failed:
fencing off the failed new node, and
causing a token manager to unilaterally revoke a token issued to the new node.

2. The computer-implemented method of claim 1, wherein applying the retrieved copy of details to the new node in the clustered filesystem includes:
customizing information corresponding to the new node, the information being selected from the group consisting of: a host name, an Internet protocol address, and a node name.

3. The computer-implemented method of claim 1, wherein retrieving a copy of the details associated with the established singleton cluster includes:
sending a request to external storage; and
receiving a copy of the template image.

4. The computer-implemented method of claim 1, wherein the clustered filesystem includes existing nodes, wherein the request to create the new node is received from one or more of the existing nodes in the clustered filesystem.

5. The computer-implemented method of claim 1, comprising:
in response to detecting a node failure in the clustered filesystem, fencing off the failed node; and
causing the failed node to relinquish a corresponding token to the token manager,
wherein the failed node relinquishes the corresponding token back to a remote token management server.

6. The computer-implemented method of claim 3, further comprising:
in response to receiving a request for permission to access and modify data in the clustered filesystem:
causing the token manager to produce a token granting access to the clustered filesystem, and
issuing the token to the new node.

7. The computer-implemented method of claim 1, wherein causing the data structures to be modified includes causing central configuration repository data, cached states, or central configuration repository data and cached states to be modified.

8. The method of claim 1, wherein the singleton cluster is established by:
creating the clustered filesystem;
using the template image as a launch image to create the singleton cluster such that the singleton cluster is preconfigured to access data in the clustered filesystem using a single node; and
collecting configuration data from the singleton cluster, wherein the configuration data is associated with accessing the clustered filesystem.

9. The method of claim 3, further comprising:
in response to the data structures of the new node being modified, requesting permission to access and modify data in the clustered filesystem;
satisfying one or more security based sub-operations issued by the token manager; and
receiving a token granting the new node access to the clustered filesystem.

10. A computer program product, comprising a computer readable storage medium having program instructions embodied therewith, the program instructions readable by a processor, executable by the processor, or readable and executable by the processor, to cause the processor to:
receive a request to create a new node in a clustered filesystem;
retrieve a copy of details associated with an established singleton cluster preconfigured to access the clustered filesystem, wherein the retrieved copy of details includes a template image;
use the template image to form a new node for the clustered filesystem by:
allocating memory space for the new node, and
updating a central repository of the clustered filesystem indicating the new node has been formed,
apply the retrieved copy of details to the new node in the clustered filesystem;
cause data structures of the new node to be modified according to the received request; and
in response to detecting the new node has failed:
fence off the failed new node, and
cause a token manager to unilaterally revoke a token issued to the new node.

11. The computer program product of claim 10, wherein the singleton cluster preconfigured to access the clustered filesystem is established by:

creating the clustered filesystem;

establishing authorization to access the clustered filesystem;

collecting configuration data associated with accessing the clustered filesystem; and storing the collected configuration data in external storage.

12. The computer program product of claim 11, wherein retrieving a copy of the details associated with the established singleton cluster includes:

sending a request to external storage; and receiving a copy of the template image.

13. The computer program product of claim 10, wherein the clustered filesystem includes existing nodes, wherein the request to create the new node is received from one or more of the existing nodes in the clustered filesystem.

14. The computer program product of claim 10, wherein the program instructions are readable and/or executable by the processor to cause the processor to:

in response to detecting a node failure in the clustered filesystem, fence off the failed node; and cause the failed node to relinquish a corresponding token, wherein the failed node relinquishes the corresponding token back to a remote token management server.

15. The computer program product of claim 10, wherein the program instructions are readable by a processor, executable by the processor, or readable and executable by the processor, to cause the processor to:

in response to receiving a request for permission to access and modify data in the clustered filesystem:

cause the token manager to produce a token granting access to the clustered filesystem, and issue the token to the new node.

16. The computer program product of claim 10, wherein causing the data structures to be modified includes causing central configuration repository data and/or cached states to be modified.

17. A system, comprising:

a first edge node connected to a central data storage location;

a processor; and logic integrated with the processor, executable by the processor, or integrated with and executable by the processor, the logic being configured to:

receive a request to create a new node in a clustered filesystem;

retrieve a copy of details associated with an established singleton cluster preconfigured to access the clustered filesystem, wherein the retrieved copy of details includes a template image;

use the template image to form a new node for the clustered filesystem by:

allocating memory space for the new node, and updating a central repository of the clustered filesystem indicating the new node has been formed, apply the retrieved copy of details to the new node in the clustered filesystem;

cause data structures of the new node to be modified according to the received request;

in response to receiving a request for permission to access and modify data in the clustered filesystem:

cause a token manager to produce a token granting access to the clustered filesystem, and issue the token to the new node; and in response to detecting the new node has failed:

fence off the failed new node, and cause the token manager to unilaterally revoke the token issued to the new node, wherein the failed new node relinquishes the corresponding token back to a remote token management server.

18. The system of claim 17, wherein the logic is configured to:

in response to detecting a node failure in the clustered filesystem, fence off the failed node; and cause the failed node to relinquish a corresponding token.

19. The system of claim 18, wherein the copy of details is retrieved from object storage using a central management server configured to manage the object storage.

20. The system of claim 17, wherein applying the retrieved copy of details to the new node in the clustered filesystem includes:

customizing information corresponding to the new node, the information being selected from the group consisting of: a host name, an Internet protocol address, and a node name.

*     *     *     *     *